(12) United States Patent
Henriksen et al.

(10) Patent No.: US 11,432,079 B2
(45) Date of Patent: Aug. 30, 2022

(54) HEARING AID WITH AUTOMATIC ANTENNA TUNING

(71) Applicant: OTICON A/S, Smørum (DK)

(72) Inventors: Poul Henriksen, Smørum (DK); Søren Nørskov, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 16/560,323

(22) Filed: Sep. 4, 2019

(65) Prior Publication Data
US 2020/0077209 A1 Mar. 5, 2020

(30) Foreign Application Priority Data

Sep. 5, 2018 (EP) .................................. 18192732

(51) Int. Cl.
*H04R 25/00* (2006.01)

(52) U.S. Cl.
CPC ..... *H04R 25/554* (2013.01); *H04R 2225/021* (2013.01); *H04R 2225/39* (2013.01); *H04R 2225/51* (2013.01)

(58) Field of Classification Search
CPC ........ H04R 25/00; H04R 25/02; H04R 25/55; H04R 25/552; H04R 25/554; H04R 25/558; H04R 2225/00; H04R 2225/021; H04R 2225/0216; H04R 2225/51; H04R 2225/53; H04R 2225/55; H01Q 5/335; H03H 2/005; H03H 2/006; H03H 2/008; H03H 5/00; H03H 5/006; H03H 5/12; H03H 7/00; H03H 7/004; H03H 7/38; H03H 7/383; H03H 7/40; H03H 11/28; H03H 11/30; H04L 25/0278

See application file for complete search history.

(56) References Cited

U.S. PATENT DOCUMENTS

| | | | | |
|---|---|---|---|---|
| 7,825,715 | B1 * | 11/2010 | Greenberg | H03B 5/1228 |
| | | | | 327/337 |
| 10,045,111 | B1 * | 8/2018 | Bonner | H04R 1/1041 |
| 2007/0197180 | A1 * | 8/2007 | McKinzie | H04B 1/0458 |
| | | | | 455/248.1 |
| 2014/0185813 | A1 | 7/2014 | Ozden et al. | |

(Continued)

FOREIGN PATENT DOCUMENTS

EP 3 334 041 A2 6/2018

*Primary Examiner* — Walter F Briney, III
(74) *Attorney, Agent, or Firm* — Birch, Stewart, Kolasch & Birch, LLP

(57) ABSTRACT

There is provided a hearing aid with an antenna connected to a transmission and/or reception circuit for transmission and/or reception of the electromagnetic energy via the antenna. A coupling circuit, e.g. including a directional coupler, is configured to sense an electric return power from the antenna, and to generate a power signal based on the sensed electric return power. A controllable impedance circuit is connected to the antenna, so as to allow adjusting of impedance of the antenna in at least two different steps. A processor is configured to generate a tuning control signal to the controllable impedance circuit in response to the power signal. This allows control of the impedance of the antenna for minimizing impedance mismatch, and thus improve performance of the antenna by tuning the impedance to the operating conditions of the antenna, preferably in an automatic manner.

20 Claims, 3 Drawing Sheets

(56) References Cited

U.S. PATENT DOCUMENTS

| | | | |
|---|---|---|---|
| 2015/0341073 A1* | 11/2015 | Ayala Vazquez | H04B 1/40 |
| | | | 455/77 |
| 2016/0373867 A1* | 12/2016 | Ozden | H04R 25/552 |
| 2017/0310008 A1* | 10/2017 | White | H01Q 5/335 |
| 2018/0076524 A1 | 3/2018 | O'Driscoll | |
| 2018/0159222 A1* | 6/2018 | Backes | H01Q 5/335 |
| 2018/0342794 A1* | 11/2018 | Han | H01Q 5/328 |
| 2019/0069068 A1* | 2/2019 | Villasenor | H04M 1/05 |
| 2019/0246221 A1* | 8/2019 | Shariati | H04N 21/00 |
| 2019/0297431 A1* | 9/2019 | Oesch | H04R 25/552 |

\* cited by examiner

HEARING AID WITH AUTOMATIC ANTENNA TUNING

FIELD

The present disclosure relates to hearing aids also called hearing instruments. More particularly, the disclosure relates to a hearing aid with a transmission and/or reception antenna which is automatically tunable for optimum impedance matching and/or radiation efficiency.

BACKGROUND

Hearing aids with wireless transmission and/or reception capabilities, e.g. using Bluetooth or Bluetooth Low Energy or the like, has the problem that a hearing aid is placed close to a person's body, and in some cases specially adapted to the physical properties of the person. E.g. a length of wires for a Receiver-In-The-Ear type hearing aid, where the transmission/receipt antenna is, or is positioned along, the wire connecting the receiver and the hearing aid housing.

Thus, with one single antenna design, optimum transmission/reception performance cannot be achieved in all situations. This means that the antenna design of a hearing aid is a compromise between transmission/reception performance and adaptation to different users.

SUMMARY

According to the above, it may be seen as an object of the present disclosure to provide a hearing aid with a magnetic field and/or electric field and/or electromagnetic signal transmission and/or reception system with is automatically adapted to provide efficient radiation and/or reception and/or optimum impedance matching.

In a first aspect, a hearing aid is provided, the hearing aid may comprise an antenna configured to transmit and/or receive electromagnetic energy. The hearing aid may comprise a controllable impedance circuit connected to the antenna, so as to allow adjusting of impedance of the antenna in at least two different steps. The hearing aid may comprise a transmission and/or reception circuit connected to the antenna for transmission and/or reception of the electromagnetic energy via the antenna. The hearing aid may comprise a coupling circuit configured to sense an impedance matching, e.g. by sensing and/or measuring and/or evaluating an electric return power from the antenna and/or sensing a voltage in the line to the antenna and/or sensing resonance frequency in the line to the antenna and/or sensing a phase shift in the line to the antenna, and to generate a power signal, indicative of the power strength and/or power level, based on the sensed impedance match and/or return power signal. If performed during transmission, the sensed power is sensed return power. The hearing aid may comprise a processor configured to receive said power signal, and to generate a tuning control signal to the controllable impedance circuit, so as to control the impedance of the antenna in response to said sensed impedance match.

Such hearing aid is advantageous at least since it allows one single antenna design to provide a high radiation efficiency with varying physical properties or environments near the antenna, such as varying load from e.g. the head, or at least the load from part of the head of the user, possibly including loading from an ear of the user. Impedance mismatch may be reduced by adjusting the impedance of the antenna according to its actual transmission or reception performance. With a processor involved in the loop of sensing return power and adjusting impedance accordingly, it is possible to program the processor to execute an algorithm which automatically optimizes the impedance of the antenna to reduce impedance mismatch to a minimum. Further, it would be possible to apply different impedances schemes for periods where the antenna is used for receiving and for periods where it is used for transmitting. Still further, it would be possible to apply different impedances schemes for different transmission events, e.g. one impedance scheme for one type of packages and another impedance scheme for another type or types of packages. Even still further during transmission periods, there may be quite periods where no actual transmission occur, and in this period an impedance scheme different from the periods with actual transmission may be used.

This means that the radiation properties, including any of electric, magnetic and/or electromagnetic, of the antenna is suited to fit e.g. properties of different persons wearing the hearing aid. Further, the design criteria for the antenna are relaxed, since e.g. its position relative to the anatomy of the person wearing the hearing aid is less important. Even with a position very close to the human anatomy, which is a vulnerable position with respect to variations, it is possible to adjust the impedance of the antenna to account for variations in the physical properties adjacent to the antenna.

In the hearing aid according to the present disclosure measures the antenna impedance matching or parameters expressing impedance matching, which reflects, or is an indication of, the radiation efficiency of the antenna. This measure can be used by the processor to determine whether to adjust the impedance of the antenna by controlling the controllable impedance circuit, which, e.g., may be made of a number of different capacitors that may be connected in a configuration selectable by the processor. Thus, with such control loop, no individual manual tuning of the antenna function is necessary in order to match the properties of an individual person. It is possible to implement the necessary circuits with well-known and simple components, and thus suitable for integration in spite the compact dimensions of a hearing aid. A set of initial values may be defined e.g. during a fitting process, where also other parameters of the hearing aid is defined for the particular user. Also, or alternatively, a set of initial values may be assigned to a particular receiver unit having e.g. a specific length may be defined and applied to the controller. Further, continuous, or recurring, adaptation of the matching may be performed. This could e.g. be done periodically, or according to a scheme, with fixed and/or varying time intervals.

The antenna may be configured to radiate and/or receive electromagnetic energy in the frequency range of 50 MHz to 50 GHz. Other frequencies may be used. The antenna and the transmission and/or reception circuit may be configured for transmission and/or reception of the electromagnetic energy at a frequency of within 2.4-6 GHz, such as around 2.4 GHz and/or around 5 GHz. The transmission and/or reception circuit preferably comprises a radio frequency carrier generation circuit. The antenna and the connected transmission and/or reception circuit may be configured for: 1) transmission only, 2) reception only, or 3) both of transmission and reception. The transmission and/or reception circuit may be implemented by a number of methods readily available to the skilled person including, but not limited to, Bluetooth radio frequency (RF) transmission. The data, received and/or transmitted, via the antenna, may be packaged using any one or more of a number of protocols, such as proprietary protocols or standardized protocols, such as Bluetooth or Bluetooth Low Energy.

The hearing aid may be configured for receiving a wirelessly transmitted audio signal via the antenna. The hearing aid may be configured for transmitting a wireless audio signal via the antenna. The hearing aid may be configured for receiving and transmitting a wireless audio signal via the antenna. In some instances, the hearing aid may in some modes of operation, be configured to either transmitting or receiving a wireless audio signal, and in other modes of operation, e.g. in another program, be configured to both transmit and receive wireless audio signal via the antenna.

The hearing aid may be a Receiver-In-The-Ear-type hearing aid comprising an In-The-Ear-Part holding a receiver, i.e. an output transducer, configured for being positioned in or at the ear canal, and a housing configured for housing at least the processor of the hearing aid and the housing configured to be positioned at least partly behind the pinna of the user during use, wherein a member mechanically connects the two parts. This member may be securely, e.g. integrally formed or attached to, connected to the In-the-ear part holding the receiver, at least so that during normal handling the user is not able to detach the member from the In-The-Ear-part. The two parts may be detached from each other. Especially, the antenna may be at least partly positioned along a wire, or multiple wires, serving to connect a receiver configured for In-The-Ear-part and the housing of the hearing aid, or at least a part of the antenna, or the entire antenna, may be formed by an electrical conductor being at least part of the electrical connection to the In-The-Ear-part. The antenna may be formed as a separate element from the one or more wires or leads extending from the Behind-The-Ear housing to the In-The-Ear-part. The antenna may be formed as part of the one or more wires or leads extending from the Behind-The-Ear housing to the In-The-Ear-part. The antenna may comprise more elements in the housing configured to be positioned behind the pinna of the user. These more elements may be one or more of parasitic elements, additional antenna elements, such as elements extending the antenna or an additional arm so that the external part and the internal part together form a structure resembling a dipole, reflectors, ground plane, or the like.

The impedance tuning according to the present disclosure may provide advantages, since the antenna may be adapted to the physical properties of the person wearing the hearing aid, and thus the antenna properties are affected by such adaptation. This can be compensated by the impedance tuning possibility provided by the hearing aid according to the present disclosure, so as to provide a more effective transmission and/or reception without the need for a special antenna design to each individual person or a variety of lengths of wires between behind the ear housing and in the ear parts.

The coupling circuit may comprise a sensing coupler configured to sense a fraction of transmission or receiving signal in one direction to or from the antenna. In general, such sensing coupler may be arranged in connection with the electric conductor connecting the antenna and the transmission and/or reception circuit, so as to sense the fraction of a Radio Frequency electric signal return power, which will reflect the impedance mismatch of the antenna. The implementation of such sensing coupler is known by the skilled person. Especially, the sensing coupler may be a directional coupler. Such directional coupler can be implemented as a ¼ wavelength coupler implemented on a PCB, and/or a narrow or wide band coupler implemented as a wound transformer coupler. Alternatively, the sensing coupler may be a non-directional coupler, e.g. a narrow or wide band coupler implemented as an inductive coupler or a capacitive coupler, e.g. integrated in an IC. The output from the sensing coupler is the preferably, via further circuit components, e.g. involving a rectifier and further components, converted to digital signal by an Analog-to-Digital-Converter (ADC) and then input to the processor and/or a resonance detector and/or a phase measuring device.

The controllable impedance circuit may comprise a plurality of circuit elements which are controllably connectable in response to the tuning control signal, so as to provide a plurality of different impedances. Especially, the circuit elements may comprise a plurality of capacitors with different capacitances, e.g. 2-6 capacitors with different capacitances and controllably connectable in parallel in response to the tuning control signal from the processor. The capacitors may each have a different capacitance or two or more may have similar capacitance. Hereby the capacitors may be combined in various ways so as to provide a number of different impedances connected to the antenna, thereby allowing adjustment of the antenna matching impedance in a number of steps. The processor may be programmed with pre-stored information about the different impedances that can be selected by the processor, and thus based on a received return power signal, it may be possible to calculate if to select a specific impedance or not, and if so, which impedance configuration to select in order to reduce, or minimize, the mismatch. It is to be understood that such control algorithm in the processor may be programmed to implement different strategies for minimizing impedance mismatch of the antenna in response to a received return power signal. One strategy, if only a limited different impedances are available to select from, e.g. 2-6, may be to select the next one of a preselected sequence of different impedances possible, in case the received power return signal is above a preselected threshold value, and then select the impedance which results in the lowest possible return power signal. Other impedance selection strategies may of course be implemented, especially if a large number of different impedance values are possible to select from.

The processor may be programmed to continuously receive the power signal, and to continuously generate a tuning control signal causing the controllable impedance circuit to adjust impedance of the antenna in order to minimize impedance mismatch of the antenna. Hereby, the hearing aid will always be optimized with respect to the antenna properties. Alternatively, the processor may be programmed to perform a control of the impedance only with a preselected time interval. The processor may be programmed or configured to generate a tuning control signal causing the controllable impedance circuit to adjust impedance of the antenna in order to minimize impedance mismatch of the antenna when the hearing aid starts up, and/or when the hearing aid detects that it is in place at or in the ear of the user. This could e.g. be determined based on input from other sensors, such as accelerometer, capacitive sensor, or other types of suitable sensors.

The impedance matching in the receiving periods could be set by a fixed set of capacitors, whereas during transmission periods the impedance matching may be defined using a configurable capacitor array. This would, also, allow the impedance matching to be based on The antenna may be any type of antenna suited for electromagnetic energy transmission and/or reception, such as designs known by the skilled person and suited for use in hearing aids. Preferably the antenna is configured to operate the in GHz range, such as around 2.4 GHz or 5 GHz or other suitable frequency ranges.

By 'hearing aid' may be understood a device that is adapted to improve or augment the hearing capability of a user by receiving a signal from a user's surroundings via an input transducer, generating a corresponding audio signal, possibly modifying the audio signal and providing the possibly modified audio signal as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing aid may be adapted to be worn in a number of known ways. This may include i) arranging a unit of the hearing aid behind the ear with a tube leading air-borne acoustic signals into the ear canal or with a receiver/loudspeaker arranged close to or in the ear canal such as in a Behind-the-Ear type hearing aid, and/or ii) arranging the hearing aid entirely or partly in the pinna and/or in the ear canal of the user such as in a Receiver In-The-Ear type hearing aid or an In-The-Ear hearing aid with an external part located behind the pinna or in the helix of the pinna, or iii) arranging a unit of the hearing aid attached to a fixture implanted into the skull bone such as in Bone Anchored Hearing Aid or Cochlear Implant, or iv) arranging a unit of the hearing aid as an entirely or partly implanted unit such as in Bone Anchored Hearing Aid or Cochlear Implant.

A wireless communication link based on the antenna and the transmission and/or reception circuit is possible between the hearing aid and an external device, such as an auxiliary device. This allows e.g. exchanging information (e.g. control and status signals, possibly audio signals) between the hearing aid and the auxiliary device. Such auxiliary devices may include at least one of remote controls, remote microphones, audio gateway devices, mobile phones such as a smart phone, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing aid. The remote control may be adapted to control functionality and operation of the hearing aid. The function of the remote control may be implemented in a SmartPhone or other electronic device, the SmartPhone/electronic device possibly running an application that controls functionality of the hearing aid, e.g. an app or other interface.

The hearing aid disclosed herein may be part of a binaural hearing aid system, where two hearing aid are to be positioned at a respective ear of the user.

In general, a hearing aid may include a microphone to capture sound, a wireless interface for receiving an input audio signal, such as the transmitted output audio signal. The processor may further be capable of processing audio signals e.g. from the microphone, and further output a processed audio signal to an output transducer, denoted a receiver, for providing an audible signal to be applied to the user's eardrum in dependence on the processed audio signal. The receiver may be capable of providing an air-borne acoustic signal transcutaneously or percutaneously to the skull bone or a vibrator for providing a structure-borne or liquid-borne acoustic signal. In some hearing aids, the output unit may include one or more output electrodes for providing the electric signals such as in a Cochlear Implant.

The processor may include an amplifier adapted to apply a frequency dependent gain to the input audio signal. The processor may be adapted to provide other relevant functionality such as compression, noise reduction, various speech enhancement processing etc.

In a second aspect, the disclosure relates to a method for matching impedance of an antenna in a hearing aid. The method may comprise sensing an electric return power from the antenna. The method may comprise generating a power signal based on the sensed electric return power. The method may comprise generating a tuning control signal in response to the power signal by the processor. The method may comprise adjusting impedance of the antenna in at least two different steps in accordance with the tuning control signal. The method may for instance be executed using a hearing aid as disclosed herein.

The same advantages apply to the second aspect as already described for the first aspect, and the method according to the second aspect may be combined with any or all of the features disclosed in relation to the first aspect and/or any other features mentioned in the present disclosure.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The processor, e.g. the main processor of the hearing aid, is understood to be implemented as a known microprocessor, microcontroller, or digital signal processors (DSPs) etc. Further, the hardware of the hearing aid may comprise such as field programmable gate arrays (FPGAs), programmable logic devices (PLDs), gated logic, discrete hardware circuits, and other suitable hardware configured to perform the various functionality described throughout this disclosure.

Figure 1:
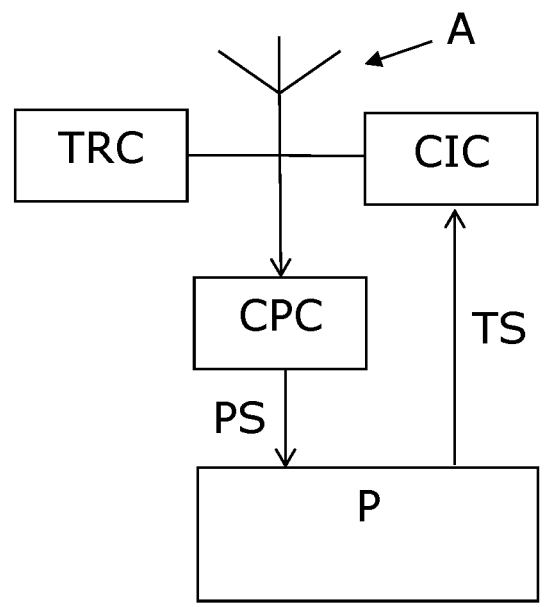
FIG. 1 shows a block diagram of elements of a hearing aid.

FIG. 1 illustrates basic elements of a hearing aid. In addition to the basic elements, an antenna A is configured to transmit and/or receive energy wirelessly to/from the hearing aid, preferably a Radio Frequency (RF) signal within 2-6 GHz. A transmission and/or reception circuit TRC is connected to the antenna A for transmission and/or reception of the electromagnetic energy via the antenna A. This circuit TRC can be implemented as in known hearing aids.

A coupling circuit CPC, e.g. involving a directional coupler, is configured to sense an electric return power from the antenna A, and to generate a power signal PS based on the sensed electric return power. This power signal PS is provided to a processor P, preferably via an ADC to provide a digital power signal.

A controllable impedance circuit CIC is connected to the antenna A, so as to allow adjusting of impedance of the antenna A in at least two different steps. This controllable impedance circuit CIC may involve a switch circuit capable of connecting various electric components to the antenna A, so as allow at least two different impedances to be connected to the antenna A. E.g. the controllable impedance circuit CIC may comprise an array of different circuit elements that may be selected in response to a tuning control signal TS from the processor P. The components implementing the impedance connected to the antenna are preferably selected to cover the range of impedances that allows for matching of the antenna impedance to compensate for expected variation in the radiation properties of the antenna A under normal conditions.

This allows the P to control or adjust the impedance of the antenna A in response to the power signal PS from the coupling circuit CPC. Hereby, the processor P can select between different impedance configurations to be connected to the antenna A using the tuning impedance signal TS.

Thereby the processor P can optimize the transmission/reception properties of the antenna A by selecting the available impedance which results in the minimum RF return power, based on the received power signal PS. This is preferably done in an automated manner, such that the hearing aid will automatically adapt the RF transmission/reception properties to its actual operating conditions. This allows the hearing aid to be used in various environments, e.g. worn by persons with different anatomies, and still it is possible to provide a high transmission/reception performance of the antenna.

Figure 2:
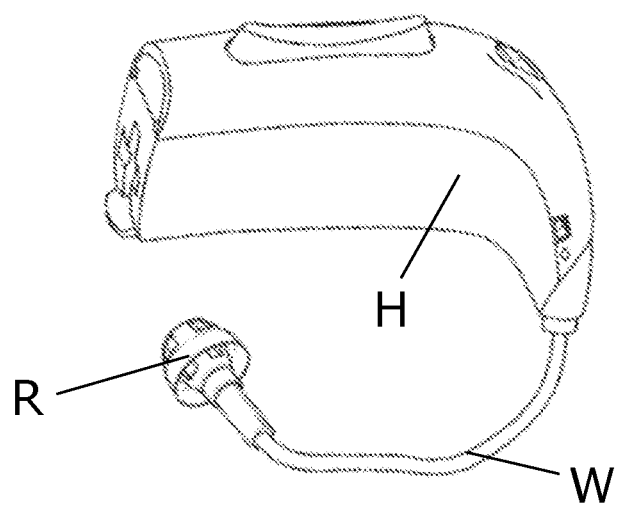
FIG. 2 shows an example of a hearing aid.

FIG. 2 shows a Receiver-In-The-Ear (RITE) hearing aid with a housing H for housing the major components of the hearing aid, including e.g. the processor, a microphone, a battery etc., while a wire W connects an audio output from the housing part H with an In-The-Ear receiver R configured for being positioned inside the ear canal of a person. The above can advantageously be implemented in a RITE type hearing aid, where the antenna is positioned along the connecting wire W, e.g. the antenna being formed by a separate electric conductor of the wire, or the antenna being at least one of the electric conductors serving to transmit the audio signal to the receiver R. Since the wire W will be adapted to the anatomy of the person to wear the hearing aid, this means that the antenna properties will change accordingly. This can be compensated by the adjustable matching impedance of the antenna according to the present disclosure.

Figure 3:
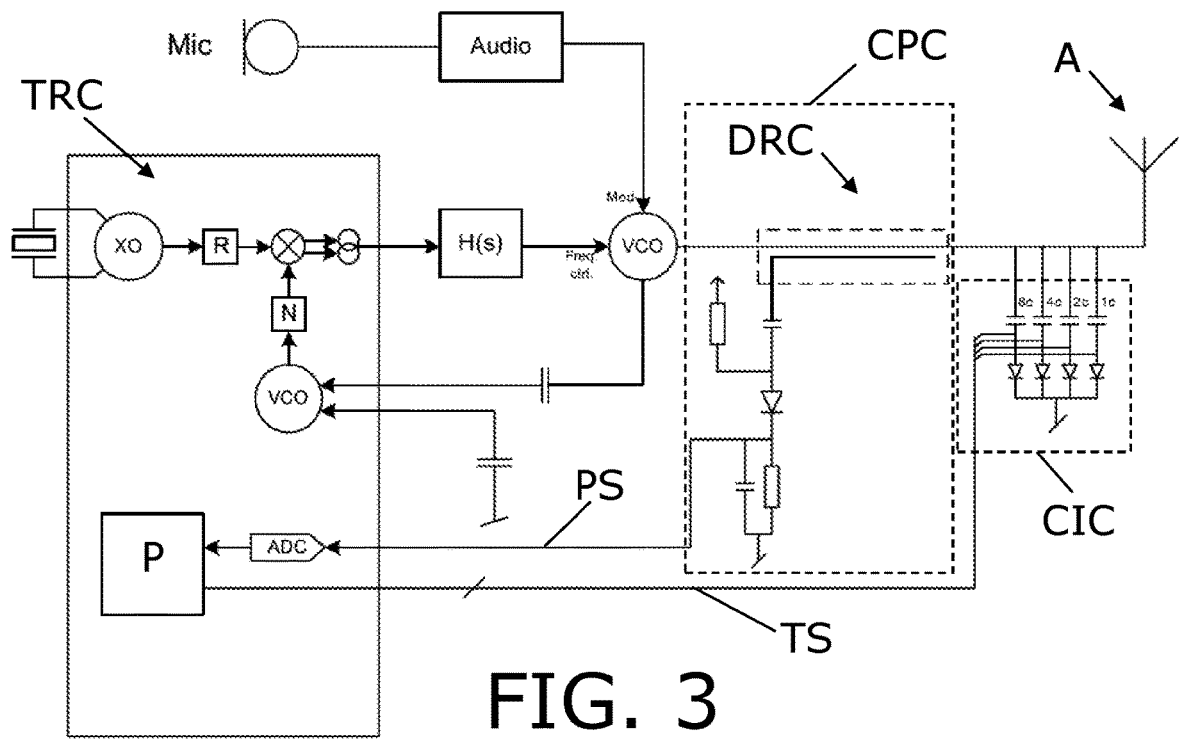
FIG. 3 shows a circuit diagram.
Figure 4:
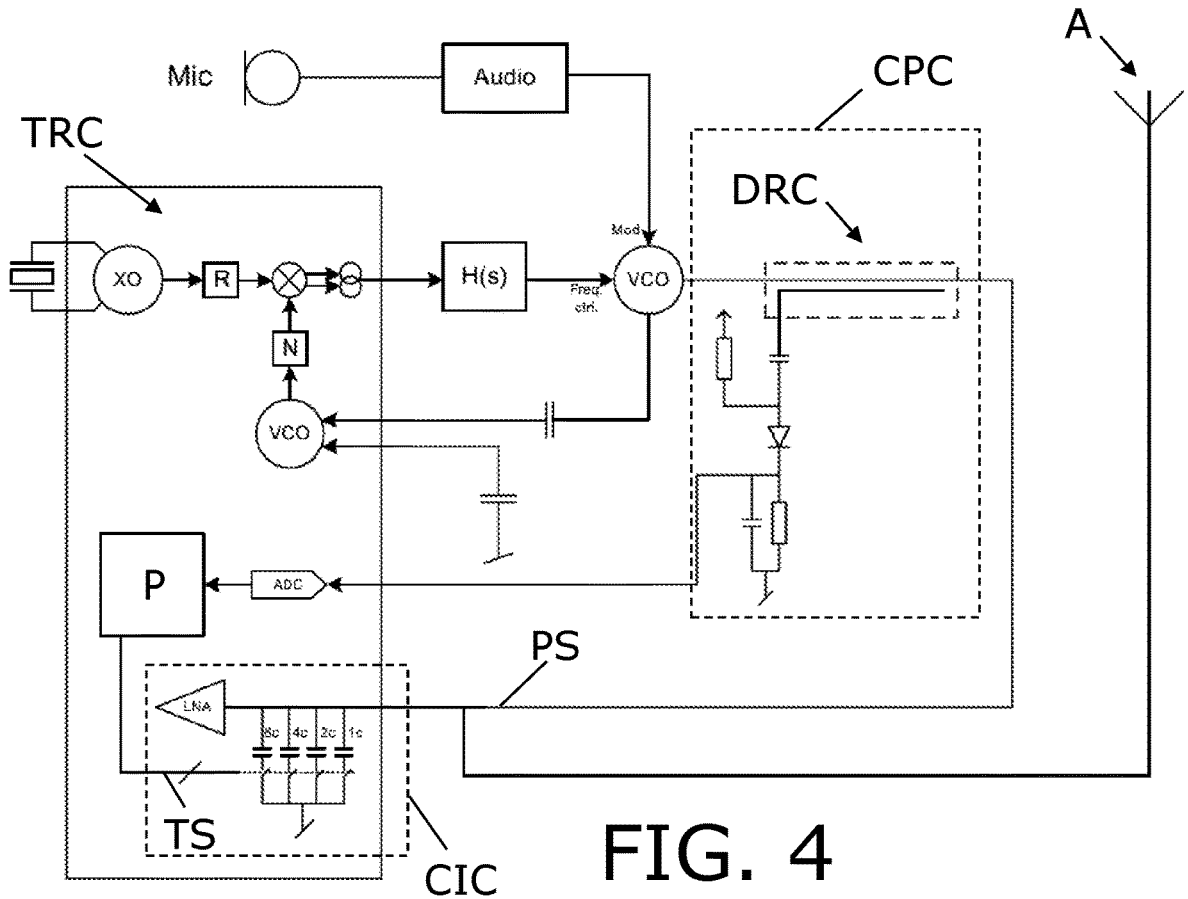
FIG. 4 shows another circuit diagram.

FIGS. 3 and 4 show schematic diagrams. For the general function reference is made to the description of FIG. 1.

In both diagrams, the coupling circuit CIC comprises a directional coupler DRC as known in the art, for generating an electric signal reflecting the electric returned power from the antenna A. The output from the directional coupler is in turn rectified to form a suitable power signal PS which is measured by an ADC and then converted into a digital signal which is applied to the processor P. The processor P can perform a 1-dimensional search and generate a tuning control signal TS to control the controllable impedance circuit CIC, so as to adjust impedance of the antenna A to obtain a minimum of impedance mismatch. The transmission and/or reception circuit TRC is at least configured to transmit an RF signal by the antenna A with an audio signal generated by a microphone represented therein, e.g. with a carrier frequency of 2.4-6 GHz, e.g. as a Bluetooth or Bluetooth Low Energy signal.

In FIG. 3, the controllable impedance circuit CIC is in the form of an external component array, i.e. with the impedance components located near the antenna A. In FIG. 4, the controllable impedance circuit CIC is in the form of an internal component array, i.e. with the impedance components located near the processor P, e.g. on the same PCB as the processor. In both diagrams, the component array which can be connected according to the tuning impedance signal TS from the processor P, is implemented as 4 capacitors in a parallel configuration, and one or more of these capacitors can be selected to provide a resulting capacitance connected to the antenna A. Either the connection circuit can be implemented such that only one capacitor can be selected at a time. Alternatively, it can be chose such that a combination of two, three or all four can be chosen simultaneously, thereby allowing a large number of possible impedances to be selected from.

In the two diagrams of FIGS. 3 and 4, the transmission and/or reception circuits TRC are implemented with a Voltage Controlled Oscillator (VCO) based RF carrier generation circuit, however it is to be understood that this circuit is merely an example which is not essential for the function. The processor P is preferably the main processor of the hearing aid, and a processor as known in the art can be used.

Figure 5:
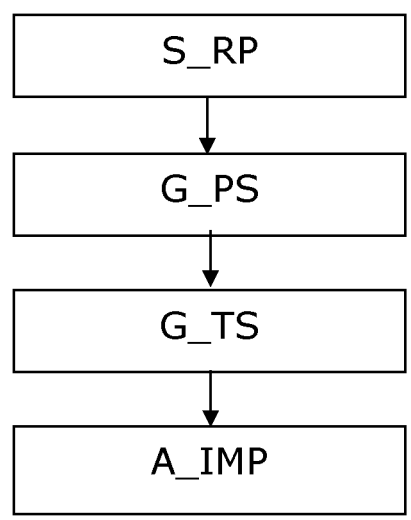
FIG. 5 shows a block diagram illustrating steps of a method.

FIG. 5 shows a diagram showing a method for matching impedance of an antenna in a hearing aid. The method comprises sensing S_RP an electric return power from the antenna. Based on the sensed electric return power, the method comprises generating G_PS a power signal PS accordingly. A processor, e.g. the main processor of the hearing aid, generates G_TS a tuning control signal in response to the power signal, e.g. the processor is programmed to generate the control signal in response to an output of an algorithm based on the power signal as input. Finally, the method comprises adjusting A_IMP impedance of the antenna in at least two different steps in accordance with the tuning control signal. Preferably, the processor is programmed to automatically adjust the impedance between a number of selectable impedances in order to reduce impedance mismatch of the antenna. Electromagnetic may cover magnetic, electrical and/or electromagnetic.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A hearing aid comprising:
   an antenna configured to transmit and/or receive electromagnetic energy,
   a controllable impedance circuit connected to the antenna, so as to allow adjusting of impedance of the antenna to one of a plurality of selectable impedances,
   a transmission and/or reception circuit connected to the antenna for transmission and/or reception of the electromagnetic energy via the antenna,
   a coupling circuit configured to sense an electric return power from the antenna, and to generate a power signal based on the sensed electric return power, and
   a processor programmed with pre-stored information about a sequence of the plurality of selectable impedances, the processor being configured to perform a discrete impedance control process of
   receiving said power signal,
   determining whether said power signal is above a preselected threshold value,
   generating a tuning control signal to the controllable impedance circuit, so as to adjust the impedance of the antenna to a next selected impedance in the sequence in response to determining that said power signal is above the preselected threshold value, and
   repeating said receiving, determining, and generating steps until said power signal is no longer above the preselected threshold value,
   wherein the processor receives notification from a sensor on the hearing aid of a change in placement of the hearing aid with respect to the ear, after startup of the hearing aid and an initial performance of the impedance control process, and
   after the initial performance of the discrete impedance control process, while the transmission and/or reception circuit is still enabled for operation, the processor waits until said notification is received before re-performing the discrete impedance control process, the re-performance of the discrete impedance control process being initiated in response to said notification.

2. The hearing aid according to claim 1, wherein the antenna is configured to radiate and/or receive electromagnetic energy in the frequency range of 50 MHz to 50 GHz.

3. The hearing aid according to claim 2, wherein the antenna and the transmission and/or reception circuit are configured for transmission and/or reception of the electromagnetic energy at a frequency of within 2.4-6 GHz.

4. The hearing aid according to claim 3, wherein the hearing aid is a Receiver-In-The-Ear type hearing aid comprising a receiver configured for In-The-Ear position and a housing configured for housing at least the processor of the hearing aid.

5. The hearing aid according to claim 3, further being configured for receiving a wirelessly transmitted audio signal via the antenna.

6. The hearing aid according to claim 2, wherein the hearing aid is a Receiver-In-The-Ear type hearing aid comprising a receiver configured for In-The-Ear position and a housing configured for housing at least the processor of the hearing aid.

7. The hearing aid according to claim 2, further being configured for receiving a wirelessly transmitted audio signal via the antenna.

8. The hearing aid according to claim 1, wherein the hearing aid is a Receiver-In-The-Ear type hearing aid comprising a receiver configured for In-The-Ear position and a housing configured for housing at least the processor of the hearing aid.

9. The hearing aid according to claim 8, wherein the antenna is at least partly positioned along a wire serving to connect the receiver and the housing of the hearing aid.

10. The hearing aid according to claim 8, further being configured for receiving a wirelessly transmitted audio signal via the antenna.

11. The hearing aid according to claim 1, further being configured for receiving a wirelessly transmitted audio signal via the antenna.

12. The hearing aid according to claim 1, further being configured for transmitting a wireless audio signal via the antenna.

13. The hearing aid according to claim 1, wherein the coupling circuit comprises a sensing coupler configured to sense a fraction of transmission or receiving signal in one direction to or from the antenna.

14. The hearing aid according to claim 13, wherein said sensing coupler is a one-directional coupler.

15. The hearing aid according to claim 13, wherein said sensing coupler is a non-directional coupler.

16. The hearing aid according to claim 1, wherein the controllable impedance circuit comprises a plurality of circuit elements which are controllably connectable in response to the tuning control signal, so as to provide a plurality of different impedances.

17. The hearing aid according to claim 16, wherein said circuit elements comprises a plurality of capacitors.

18. The hearing aid according to claim 1, wherein the processor is programmed to continuously receive the power signal, and to continuously perform said control process to generate a tuning control signal thereby causing the controllable impedance circuit to adjust impedance of the antenna in order to minimize impedance mismatch of the antenna.

19. The hearing aid according to claim 1, wherein the transmission and/or reception circuit comprises a radio frequency carrier generation circuit.

20. A method for matching impedance of an antenna in a hearing aid, the method comprising sensing, by a coupling circuit, an electric return power from the antenna, generating, by the coupling circuit, a power signal on the sensed electric return power, generating, by a processor, a tuning control signal to a controllable impedance circuit in response to the power signal, wherein the processor is programmed with pre-stored information about a sequence of selectable impedances in the controllable impedance circuit connected to the antenna, and the processor generates the tuning control signal by performing a discrete impedance control process of receiving said power signal, determining whether said power signal is above a preselected threshold value, generating the tuning control signal so as to adjust an impedance of the antenna to a next selected impedance in the sequence in response to determining that said power control signal is above the preselected threshold value, and repeating said receiving, determining, and generating steps until said power signal is no longer above the preselected threshold value, wherein the processor receives notification from a sensor on the hearing aid of a change in placement of the hearing aid with respect to the ear, after startup of the hearing aid and an initial performance of the discrete impedance control process, and after the initial performance of the discrete impedance control process, and while the transmission and/or reception circuit is still enabled for operation, the processor waits until said notification is received before re-performing the discrete impedance control process, the re-performance of the discrete impedance control process being initiated in response to said notification.

* * * * *